United States Patent
Legatti et al.

[11] 3,899,717
[45] Aug. 12, 1975

[54] GROUND FAULT DETECTORS

[75] Inventors: Raymond H. Legatti, Belleair;
Charles M. Clinton, Safety Harbor;
Charles W. Draper, Clearwater, all of Fla.

[73] Assignee: Electromagnetic Industries, Inc., Fla.

[22] Filed: July 16, 1973

[21] Appl. No.: 379,263

[52] U.S. Cl. ....... 317/18 D; 317/33 SC; 317/36 TD
[51] Int. Cl. ............................................ H02h 3/28
[58] Field of Search .......... 317/18 D, 33 SC, 36 TD

[56] References Cited
UNITED STATES PATENTS
3,539,866  11/1970  Stevenson ..................... 317/18 D

*Primary Examiner*—James D. Trammell
*Attorney, Agent, or Firm*—McGlew and Tuttle

[57] ABSTRACT

A current transformer has a primary winding through which the conductors of the protected circuit pass, and has a secondary winding. A rectifier bridge has input terminals connected to the secondary winding and has output terminals connected to a capacitor for charging the capacitor solely by a rectified fault current. A voltage divider is connected across the capacitor and monitors the capacitor voltage. An SCR is connected in a series circuit including the capacitor and the operating winding of service disconnect equipment connected in the protected circuit. A Zener diode is connected between the voltage divider and the gate of the SCR and is operable, responsive to the monitored voltage across the capacitor attaining a preselected magnitude, to trigger the SCR conductive to discharge the capacitor through the operating winding of the protective equipment to open the latter. The current transformer operates in the zero sequence mode to produce an output voltage proportional only to the ground fault current, and the current transformer constitutes the sole source of power for the ground fault detector. In a second embodiment of the invention, a second capacitor is charged to the peak DC voltage from the rectifier bridge, but through a diode. In this embodiment, transistors and further Zener diodes are associated with further capacitors to control the triggering of the SCR. The fault detector includes a novel time delay circuit operable to attain extremely short time delays of less than 30 msec. while having sufficient range to permit delays of up to 600 msec. The mentioned second capacitor prevents "nuisance" trips.

10 Claims, 12 Drawing Figures

GROUND FAULT DETECTORS

FIELD AND BACKGROUND OF THE INVENTION

This invention relates to ground fault detectors and, more particularly, to a novel, improved and simplified ground fault detector connected to the secondary winding of a current transformer through which pass the conductors of a circuit, and powered solely by fault current to operate service disconnect equipment responsive to a ground fault current.

Ground fault detectors are provided in association with electrical circuits to protect electrical equipment from destructive arcing ground faults. Known ground fault detectors have the disadvantage that they are continuously energized by power taken from the circuit being monitored as to ground faults. Such continual energization results in a heating of the components as well as in reduced life of the components.

Known ground fault detectors embody various circuit components, with many known ground fault detectors utilizing current transformers to detect the presence of a ground current. Other arrangements are known in which elements other than a current transformer are used to detect the presence of a ground current. However, these known arrangements have, in common, not only the aforementioned continuous energization from the circuit being protected but also complicated and extensive electrical networks, transformers in addition to current transformers, batteries, and various other additional components. Consequently, it has not been possible, hitherto, to provide a compact "self-powered" ground fault detector which is reliable in operation, requires only minimum space for installation, and which is energized only in the presence of a detected ground fault.

SUMMARY OF THE INVENTION

The objective of the invention is to provide an improved and simplified compact ground fault detector including a current transformer constituting the sole source of power for the ground fault detector and operating in the zero sequence mode so that current is supplied to the ground fault detector only responsive to the presence of a ground fault current.

To this end, a ground fault detector embodying the invention and operable to open service disconnect equipment, having an operating winding, in the protected circuit, includes a current transformer having a primary winding through which conductors of the protected circuit are adapted to pass, and having a secondary winding. A rectifier bridge has input terminals connected to the secondary winding and output terminals across which there is connected a capacitor for charging of the capacitor solely by a rectified fault current. A voltage divider connected across the capacitor monitors the voltage across the capacitor, and a normally open switch, such as an SCR, is connected in a series circuit including the capacitor and the operating winding of the service disconnect equipment. A voltage responsive device, such as a Zener diode, is connected between the voltage divider and the normally open switch and is operable, responsive to the monitored voltage across the capacitor attaining a preselected magnitude, to close the normally open switch, as by triggering the SCR conductive, to discharge the capacitor through the operating winding to open the service disconnect equipment.

In a further embodiment of the invention, a second condenser is connected across the output terminals of the rectifier bridge in series with a rectifying diode. A Zener diode is connected to the voltage divider and is in controlling relation with a first transistor. This first transistor controls the energization of a second transistor and a third transistor, each of which has a respective capacitor connected thereacross and forming part of an adjustable time delay circuit including resistors. The condenser or capacitor connected across the third transistor establishes the breakdown voltage of a Zener diode which controls triggering of the SCR connected in series with the operating coil of the disconnect equipment.

In this embodiment of the invention, and assuming that a steady state fault exists, but that the voltage across the first capacitor is below the magnitude required to trigger the Zener diode connected to the voltage divider conductive, the first transistor is non-conductive and this results in the second and third transistors being conductive and preventing charging of their associated capacitors. Consequently, the SCR is not triggered conductive. As the fault current increases, the voltage across the first and second capacitors increases and eventually reaches the breakdown voltage of the Zener diode connected to the voltage divider. This Zener diode then breaks down and triggers the first transistor conductive which, in turn, makes the second and third transistors non-conductive so that their respective capacitors can charge. When the voltage across the capacitor controlling energization of the Zener diode in turn controlling triggering of the SCR reaches a predetermined magnitude, this Zener diode triggers the SCR conductive to open the disconnect equipment.

The novel time delay circuit can attain extremely short time delays of less than 30 msec, when a control is set to the "instantaneous" position, but has sufficient range to permit delays up to 600 msec with the time delay control set to the maximum delay position. An adjustable resistor in the time delay circuit functions not only as a conventional variable RC time constant control, but also selects between a large time constant capacitor connected across the second transistor for long delays and a small capacitor, for short delays, connected across the third transistor.

The second capacitor is isolated from the first capacitor to prevent "nuisance" trips. If an intermittent fault appears and remains for a period of time less than the delay time setting, this second capacitor will be charged and, due to its capacity, will require about 0.5 second to discharge through the high impedances of the circuit. If the voltage divider monitored the voltage on the second capacitor, the ground fault detector would "time out" and trip even though the fault were no longer present. Due to the diode rectifier, the voltage divider is isolated from the second capacitor and monitors only the voltage across the first capacitor. As the capacity of the first capacitor is only approximately one-twentieth that of the capcity of the second capacitor, the first capacitor discharges very rapidly when a fault is removed so that the first transistor is triggered non-conductive thus triggering the second and third transistors conductive to stop the timing sequence.

An object of the invention is to provide an improved ground fault detector which receives its power solely from the secondary winding of a current transformer having a primary winding through which the conductors of the circuit to be protected are adapted to pass.

Another object of the invention is to provide such a ground fault detector in which the current transformer acts in the zero sequence mode so that current is supplied to the ground fault detector only responsive to a ground fault current.

A further object of the invention is to provide such a ground fault detector including a novel time delay circuit having a very wide range of time delay values.

Yet another object of the invention is to provide such a ground fault detector capable of preventing "nuisance" trips by intermittent faults remaining for a period of time less than a delay time setting.

For an understanding of the principles of the invention, reference is made to the following description of typical embodiments thereof as illustrated in the accompanying drawings.

DESCRIPTION OF THE PREFERRED EMBODIMENTS

Figure 1:
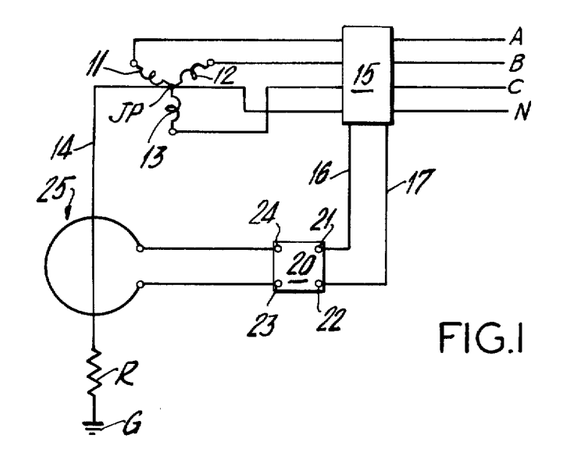
FIGS. 1, 2 and 3 are schematic wiring diagrams illustrating a ground fault detector embodying the invention as connected, respectively, to a Y-connected three-phase AC circuit having a resistance grounded neutral, to a Y-connected three-phase AC circuit having a solid grounded neutral and to a delta-connected three-phase circuit.

Referring to FIG. 1, in the resistance grounded neutral, Y-connected, AC circuit therein illustrated, conductors A, B and C are connected to respective windings 11, 12 and 13 which are commonly interconnected at a junction point JP to which a neutral conductor N is connected. Junction point JP is connected to ground G through a resistor R and a grounding conductor 14. In a conventional manner, a service disconnect device 15, which may be a shunt trip circuit breaker or a contactor, is operable to disconnect the load, connected to all the conductors A, B, C and N, from the potential source which is the windings 11, 12 and 13.

Service disconnect devices, or circuit interrupting equipment, such as that shown at 15, are generally operated automatically by energization of an operating or trip coil. In accordance with the invention, such an operating or trip coil is connected by conductors 16 and 17 to output terminals 21 and 22 of a ground fault detector embodying the invention and generally indicated at 20. It will be noted that, in the particular circuit illustrated in FIG. 1, the circuit interrupting equipment 15 is oprable to disconnect all four conductors. In this circuit, a current transformer generally indicated at 25 has the grounding conductor 14 extending through its primary winding, and its secondary winding is connected to the input terminals 23 and 24 of ground fault detector 20. Current transformer 25 operates in the zero sequence mode, so that it produces an output secondary winding voltage only responsive to flow of a fault current through grounding conductor 14. Furthermore, current transformer 25 constitutes the sole source of operating power for ground fault detector 20, which is thus completely de-energized except when there is a ground fault current in conductor 14. The operation of ground fault detector 20 will be described more fully hereinafter.

Figure 2:
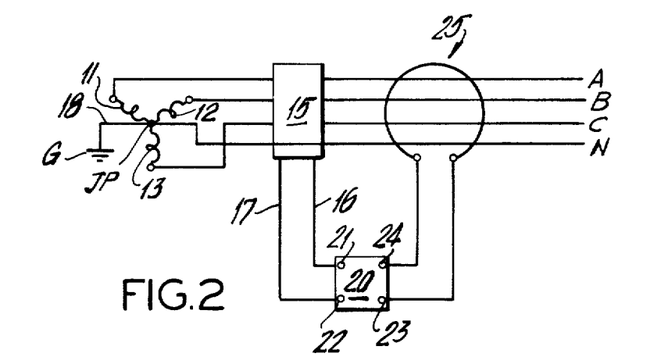

FIG. 2 illustrates another circuit with which ground fault detector 20 may be used, and corresponding parts have been indicated with the same reference characters. The circuit shown in FIG. 2 is a Y-connected circuit with a solid grounded neutral and differs from the circuit shown in FIG. 1 in that junction point JP is connected to ground G directly by a grounding conductor 18 and without the interposition of the resistor R. Also, the circuit interrupting equipment 15 is operable to interrupt only the conductors A, B and C, but not the neutral conductor N. In the circuit shown in FIG. 2, all four conductors extend through the primary winding of current transformer 25.

Figure 3:
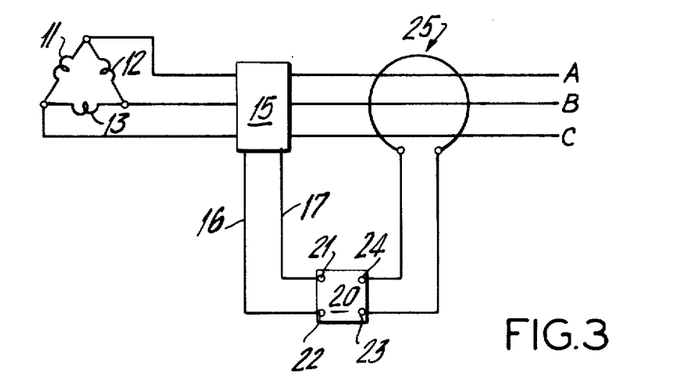

FIG. 3 illustrates a ground fault detector 20 embodying the invention as connected to control a delta-connected circuit in which all three conductors A, B and C are controlled by circuit interrupting equipment 15 and extend through the primary winding of current transformer 25. FIGS. 1, 2 and 3 are representative of various types of circuits with which the ground fault detector of the invention and its associated current transformer 25 can be used to control the operation of circuit interrupting equipment 15.

Figure 4:
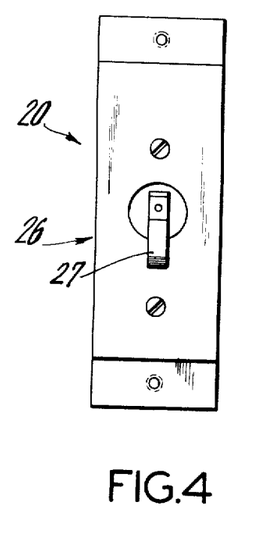
FIG. 4 is a front eleation view of one form of ground fault detector embodying the invention.
Figure 5:
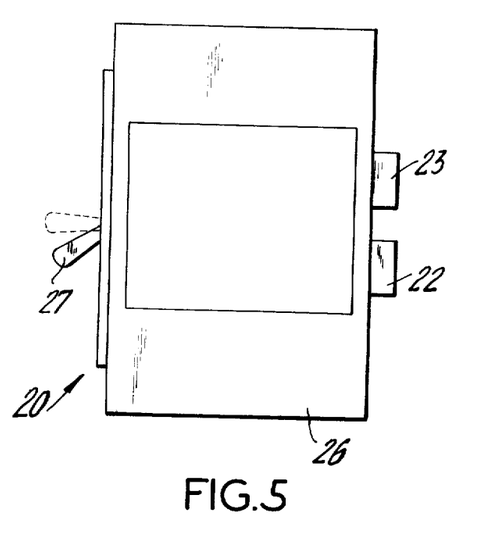
FIG. 5 is a side elevation view corresponding to FIG. 4.
Figure 6:
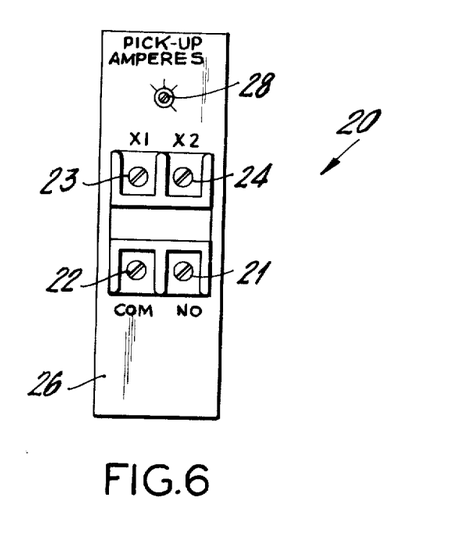
FIG. 6 is a rear elevation view corresponding to FIG. 4.

Referring to FIGS. 4, 5 and 6, a ground fault detector embodying the invention has its components mounted within a casing 26 having a front panel with a switch 27. Switch 27 has a red target indicating the tripped condition, which is shown in FIGS. 4 and 5, and a green target indicating the nontrip condition, which is shown in dotted lines in FIG. 5. It will be noted, particularly from FIGS. 1 and 2, that the casing 26 is readily mounted on a panel board or the like, to which it may be secured by suitable screws or bolts. The rear panel of casing 26 includes the contacts 21-24 as well as an adjustable element 28 for setting the "pick-up" amperes of the ground fault detector.

Figure 7:
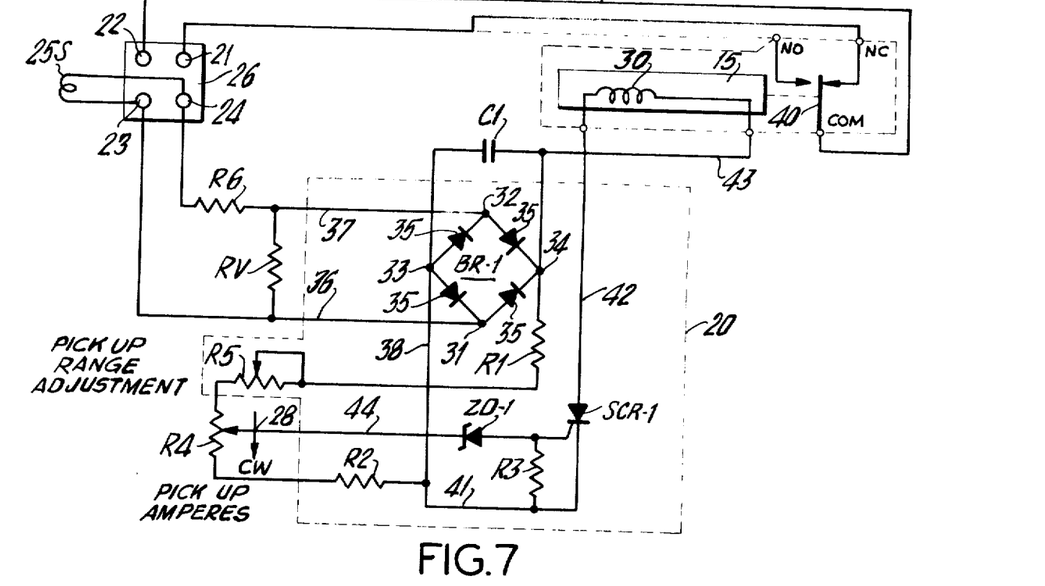
FIG. 7 is a schematic wiring diagram of the ground fault detector shown in FIGS. 4, 5 and 6.

Referring to FIG. 7, which is a schematic wiring diagram of the ground fault detector 20, the secondary winding 25S of a current transformer is connected to terminals 23 and 24 of casing 26. As illustrated in FIGS. 1, 2 and 3, the conductors of the protected service pass through the primary winding of the current transformer 25 having the secondary winding 25S, and current transformer 25 operates in the zone sequence mode to produce a voltage output proportional only to ground fault current. The terminals 23 and 24 are connected by respective conductors 36 and 37 to the input terminals 31 and 32, respectively, of a full wave rectifier bridge BR1 formed by diodes 35, BR1 having output terminals 33 and 34. A condenser C1 is connected across output terminals 33, 34, as is also a voltage divider comprising the resistors R1, R2, R4 and R5. Of these resistors, resistors R1 and R2 are fixed resistors, resistor R4 is adjustable means 28 to set the pickup amperes, and resistor R5 is adjustable to set the range of pickup amperes. Resistor R4 is a field adjustment, while resistor R5 is an internal factory adjustment to align the pickup current limits. A resistor RV is connected across the conductors 36 and 37 to limit the voltage across bridge BR1, and a resistor R6 in series in conductor 37 limits the current through resistor RV.

Resistor R1 has one end connected directly to output terminal 34 of bridge BR1, and resistor R2 has one end connected by a conductor 38 to the other output terminal 33 of the full wave rectifier bridge. A conductor 41 connects the junction of conductor 38 and resistor R2 to the cathode of SCR1, and a conductor 42 connects the anode of SCR1 to one end of control winding 30 of circuit interrupting equipment 15. The other end of control winding 30 is connected by a conductor 43 to that terminal of condenser C1 connected to output terminal 34 of bridge BR1. A conductor 44, having a Zener diode ZD1 connected in series therein, connects the adjustable tap of resistor R4 to the gating electrode of silicon controlled rectifier SCR1. A resistor R3 connected across conductors 41 and 44 provides the voltage drop between the cathode and gating electrode of SCR1. It will be noted that control winding 30 controls the operation of a switch arm 40 of the circuit interrupting equipment 15, this switch arm 40 being connected by a conductor 46 to the "common" terminal 22 of casing 26. The other terminal 21 of casing 26 may be selectively connected to one of the two terminals controlled by switch arm 40, depending upon whether an operating coil is normally closed or normally open, the alternative connections being indicated by the solid line and by the dash lines.

Under a "no-fault" condition, current transformer 25 will produce a zero secondary output voltage from its secondary winding 25S. As a result, the ground fault detector 20 will remain in an idle condition. Since the ground fault detector 20 is powered only by the fault current, no current will flow through any component in the ground fault detector 20.

The voltage divider, comprising the resistors R1, R2, R4 and R5 monitors the DC voltage across condenser C1, and this DC voltage is, in turn, a function of the current transformer output as rectified by bridge BR1. When the voltage of the adjustable tap of resistor R4 reaches the breakover voltage of Zener diode ZD1, which may be, for example, 24 volts, the pickup sequence is initiated. SCR1 is triggered conductive, and the current therethrough energizes the control winding 30 of the circuit interrupting equipment 15.

The ground fault detector 20 is designed to energize the circuit interrupting equipment 15 at pickup currents as low as 5 amperes. This accomplished with no control power, that is, the ground fault detector receives all of the energy it requires from the ground fault current passing through the primary winding of current transformer 25. The energy is stored in the capacitor C1, which may have a capacity of, for example 4.7 ufd. A novel feature of the ground fault detector is that when SCR1 is triggered conductive, it "dumps" the charge in capacitor C1 through the control winding 30. Should, for any reason, the control equipment fail to be energized, the sequence will be repeated automatically. The ground fault detector is "trip-free", that is, the circuit will re-trip if the ground fault equipment is manually reset when a fault is present.

Figure 8:
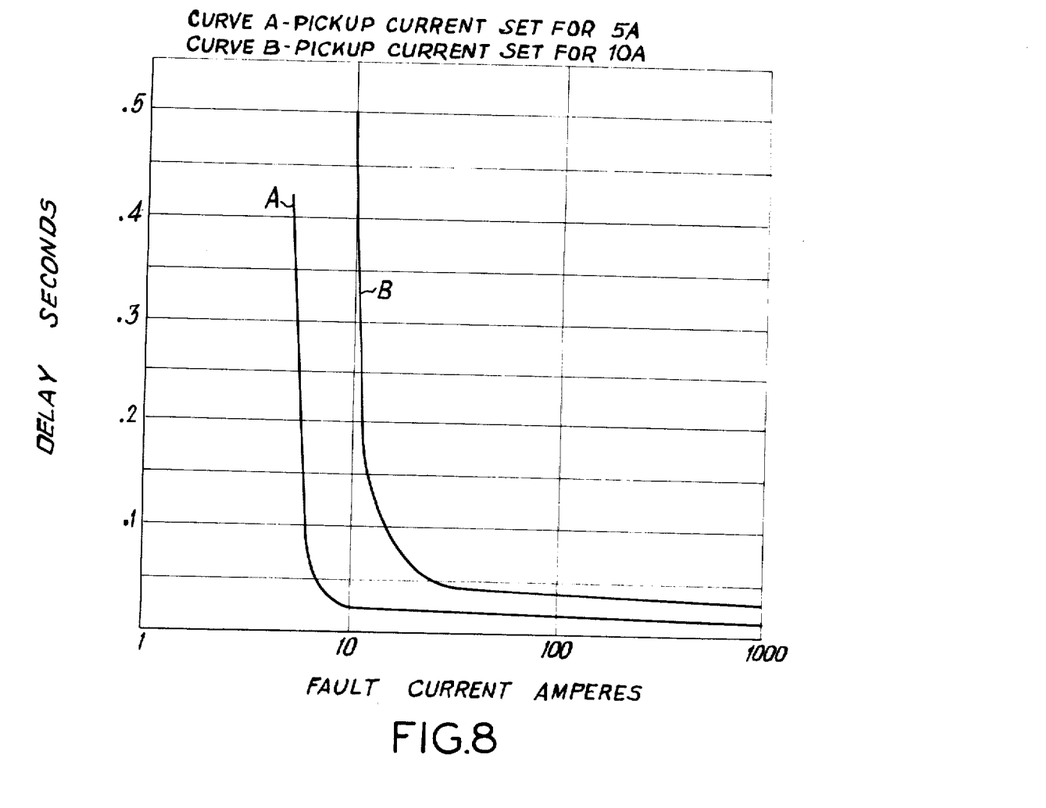
FIG. 8 is a graphical representation of the relation between ground fault currents and delay times with the ground fault detector shown in FIGS. 4 through 7.

The ground fault detector has an inverse time characteristic, as will be apparent from the curves A and B of FIG. 8 representing the relation between the fault current amperes and the delay seconds. From these curves, it will be noted that the larger the fault current, the quicker the ground fault detector operates, so that at a ground fault current of 10 to 1,000 amperes, the ground fault detector operates substantially instantaneously.

Figure 9:
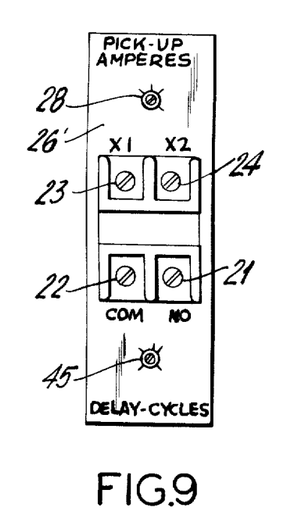
FIG. 9 is a rear elevation view of another embodiment of ground fault detector in accordance with the invention.

FIGS. 9 through 12 illustrate a second embodiment of the invention which operates in essentially the same manner as that shown in FIGS. 4 through 8, but which incorporates an adjustment by means of which the delay time, in cycles, may be field adjusted from instantaneous pickup to pickup with a time delay of 36 cycles corresponding to 0.6 seconds. The instantaneous pickup occurs at 0.025 seconds. Referring to FIG. 9, the unit is encased in a casing 26' which differs from the casing 26 only in that a "DELAY-CYCLES" adjustment 45 is provided on the rear panel of casing 26'. As best seen in the schematic wiring diagram of FIG. 10, the terminals 23 and 24 of casing 26', and to which the current transformer secondary winding 25S is connected as shown in FIG. 7, are connected by respective conductors 36 and 37 to the input terminals 31 and 32 of bridge BR1 having output terminals 33 and 34 and again composed of diodes 35. As in the embodiment of the invention shown in FIG. 7, a resistor RV is connected across conductors 36 and 37 to limit the voltage across bridge BR1, and a resistor R6 in series in conductor 37 limits the current through resistor RV under high fault current conditions. Also as in FIG. 7, conductor 46 connects terminal 22 to the common switch arm 40 associated with the operating coil 30 of the service disconnect equipment 15.

Figure 10:
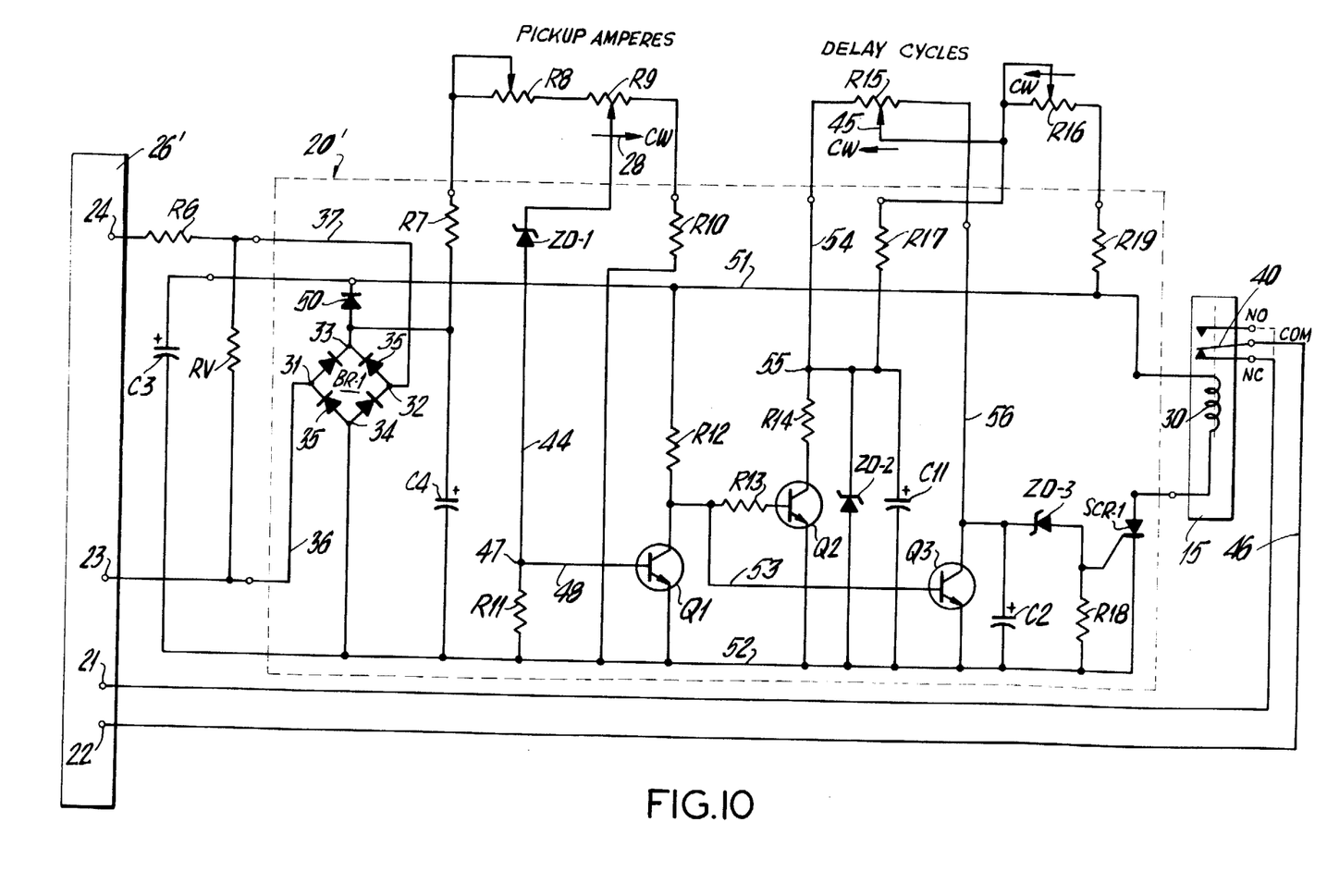
FIG. 10 is a schematic wiring diagram of the ground fault detector shown in FIG. 9.

A capacitor C4 is connected across output terminals 33 and 34 of the bridge, and a voltage divider consisting of resistors R7, R8, R9 and R10 is also connected across these output terminals in parallel with capacitor C4 to establish the pickup current by monitoring the DC voltage across capacitor C4 and which, in turn, is a function of the current transformer secondary output voltage as rectified by bridge BR1. A condenser C3 is connected across output terminals 33 and 34, but in series with a diode 50, condenser C3 being also charged to the peak DC voltage of the bridge but through the diode 50. Resistors R7 and R10 are fixed, but resistors R8 and R9 are adjustable. Resistor R8 is an internal factory adjustment to align the pickup current limits, and resistor R11 is a field adjustment for the pickup amperes. Zener diode ZD1 is connected to the adjustable tap of resistor R9 and by a conductor 44 to a junction point 47 connected through a conductor 48 to the base of a transistor Q1. A first common conductor 51 is connected to output terminal 33 of bridge BR1 through diode 50, and a second common conductor 52 is connected to output terminal 34 of the bridge. A resistor R11 connects junction point 47 to conductor 52, thus providing a base bias for transistor Q1 whose emitter is connected directly to conductor 52. The collector of transistor Q1 is connected to common conductor 51 through a resistor R12, and is also connected through a resistor R13 to the base of transistor Q2 and directly, by a conductor 53, to the base of a third transistor Q3.

A resistor R14 is connected between the collector of transistor Q2 and a junction point 55 connected by a conductor 54 to one terminal of resistor R15 which is adjustable by the adjustment means 45 to set the number of delay cycles. The adjustable tap of resistor R15 is connected to one terminal of an adjustable resistor R16 which sets the maximum delay adjustment, and the other terminal of resistor R16 is connected through a resistor R19 to conductor 51 which, in turn, is connected to one terminal of control winding 30 of service disconnect equipment 15. The other terminal of control winding 30 is connected through SCR1 to conductor 52.

A condenser C11 is connected between junction point 55 and conductor 52, and a Zener diode ZD2 is connected in parallel with condenser C11 to prevent the voltage across C11 from exeeding the rated voltage thereof. Condenser C11 and Zener diode ZD2 are commonly connected through a resistor 17 to the adjustable taps of resistors R15 and R16. Resistor R15 provides a field adjustment of the delay cycles, and resistor R16 is an internal factory adjustment to align the time limits.

The emitter of transistor Q3 is connected to conductor 52, and a conductor 56 connects the collector of transistor Q3 to an end of adjustable resistor R15. A condenser C2 is connected across the collector-emitter circuit of transistor Q3, and a Zener diode ZD3 connects the collector of transistor Q3 and one terminal of capacitor C2 to the gating electrode SCR1. A resistor R18 connected between the gating electrode and conductor 52 provides the gate-cathode bias of SCR1.

The arrangement operates in the following manner. When the voltage at the adjustable tap of resistor R9 attains the breakover voltage of Zener diode ZD1, which may be, for example, 6.2 volts, the pickup sequence is initiated. Assuming, for the moment, that a steady state fault exists below the level necessary for breakover of Zener diode ZD1 of sufficient amplitude to "power-up" the fault current detector, the following conditions exist:

a. Transistor Q1 is non-conductive.

b. Transistor Q2 is conductive because of the forward bias current received from the positive side of capacitor C3 through resistor R12 and R13. The low impedance of transistor Q2 prevents condenser C11 from charging.

c. Transistor Q3 is conductive because of the forward bias current through resistor R12, and prevents condenser C2 from charging.

d. The voltage across capacitor C2 is applied to the cathode of Zener diode ZD3. Since capacitor C2 is not charged, Zener diode ZD3 is non-conductive and no gate signal is available for silicon controlled rectifier SCR1. SCR1 is therefore non-conductive and no current flows through control coil 30 of circuit interrupting equipment 15.

As the ground fault current increases, the voltage across capacitor C3 and capacitor C4 increases. At some point between approximately 80 and 160 volts, depending upon the setting of resistance R9, the adjustable tap of resistance R9 will reach 6.2 volts and Zener diode ZD1 will break down and conduct. At this time, the following will occur.

a. The current through Zener diode ZD1 will trigger transistor Q1 conductive, and the collector voltage of transistor Q1 will drop below 0.6 volts.

b. Transistors Q2 and Q3 will become non-conductive allowing capacitors C1 and C2 to begin to charge toward the voltage across capacitor C3. When the voltage across capacitor C2 attains 12 volts, Zener diode ZD3 will breakover and become conductive. This will gate SCR1 conductive to energize control coil 30.

c. The time delay between the breakover of Zener diode ZD1 and the breakover of Zener diode ZD3 is determined by the time constant derived from resistors R19, R16, R17 and R15 in association with capacitors C11 and C2. The ground fault detector shown in FIG. 10 has the same automatic recycling and trip-free characteristics as the ground fault detector shown in FIG. 7.

The time delay circuit of the embodiment of the invention shown in FIG. 10 constitutes a particularly novel feature of the presnt invention. The problem was to attain extremely short time delays, of less than 30 msec, when the time delay control was set to its instantaneous position while still having sufficient range to permit delays of up to 600 msec when the time delay control was set to the maximum delay position. To accomplish this, resistor R15 of the time delay control functions not only as a conventional variable RC time constant control but also selects between a large time constant capactior C11 for long delays and a small capacitor C2 for short delays. Resistor R17 improves the linearity of resistor R15.

Capacitor C4 is isolated from capacitor C3 to prevent nuisance trips. If an intermittent fault appears and reamins for a period of time less than the delay time setting, capacitor C3 will be charged and, due to its capacity, require almost 0.5 seconds to discharge through the high impedances of the circuit. If the input voltage divider consisting of resistors or resistances R7, R8, R9 and R10 monitored the voltage across capacitor C3, the unit would time-out and trip even through the fault were no longer present. Due to diode 50, the voltage divider is isolated for capacitor C3 and monitors only the voltage across capacitor C4. As the capacity of capacitor C4 is only approximately one-twentieth that of capacitor C3, it discharges very rapidly when a fault is removed. Transistor Q1, therefore, becomes non-conductive, triggering transistors Q2 and Q3 conductive, which stops the timing sequence. By way of example, capacitor C3 may have a capacity of 4.7 ufd, and capacitor C4 may have a capacity of 0.22 ufd.

Figure 11:
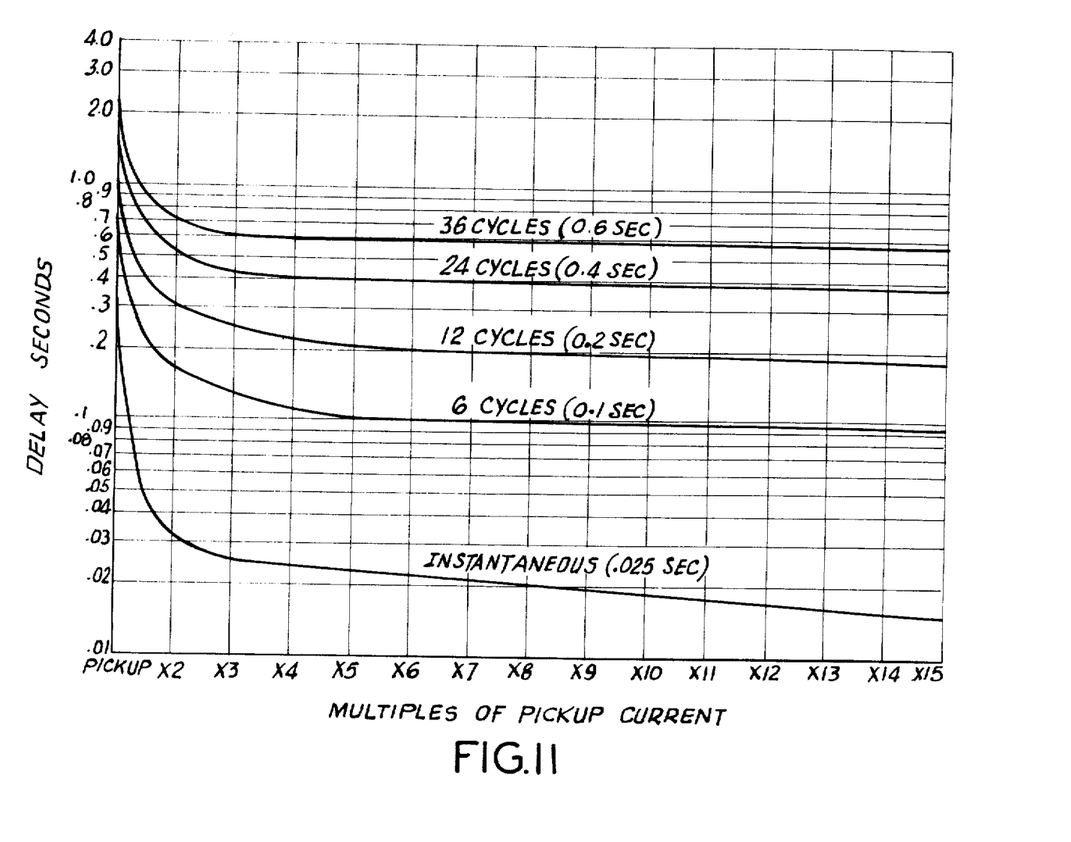
FIG. 11 is a graphical representation of the relation between multiples of the pickup current and the time delay with the ground fault detector shown in FIGS. 9 and 10.

FIG. 11 graphically illustrates the relation between the time delay in seconds and the multiples of the pickup current as set by the time delay adjustment, illustrating the instantaneous curve and the curves for six cycle time delay, 12 cycles time delay, 24 cycles time delay and 36 cycles time delay having respective delay times of 0.1 second, 0.2 second, 0.4 second and 0.6 second. This figure furthermore illustrates the inverse time characteristic of the embodiment of the invention shown in FIG. 10.

Figure 12:
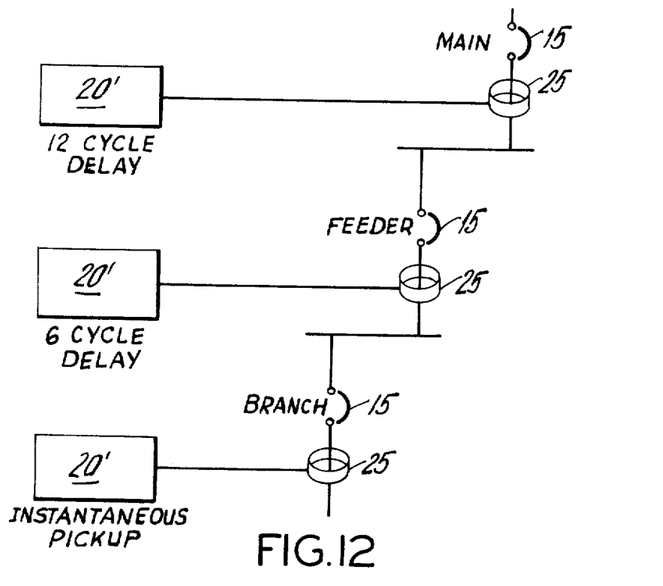
FIG. 12 is a schematic diagram illustrating the time delay coordination of a main circuit, a feeder circuit, and a branch circuit, each provided with a ground fault detector such as shown in FIGS. 9, 10 and 11.

FIG. 12 illustrates how three of the ground fault detectors 20', such as shown in FIG. 10, can be used in a service setup involving a main circuit, a feeder circuit and a branch circuit, each equipped with a respective current transformer 25 and a respective circuit interrupting equipment 15. In such a case, the ground fault detector 20' associated with the branch circuit is adjusted for instantaneous pickup as represented by the lowermost curve in FIG. 11. The ground fault detector 20' associated with the feeder circuit is adjusted for a six cycle delay, as shown in the second lowermost curve of FIG. 11, and the ground fault detector 20' associated with the main circuit is set for a twelve cycle delay as shown in the third curve of FIG. 11.

From the foregoing description of the two embodiments of the invention, it will be clear that a ground fault detector has been provided which is of compact nature and which is self-powered by the fault current, in that no current flows through any component of the ground fault detector except when the current transformer is energized by a ground fault current in a protected circuit. Furthermore, the second embodiment of the ground fault detector has a novel time delay arrangement in which the delay time is field adjustable between instantaneous pickup and pickup after 36 cycles or 0.6 second. The pickup current can also be readily adjusted in the field.

While specific embodiments of the invention have been shown and described in detail to illustrate the application of the principles of the invention, it will be understood that the invention may be embodied otherwise without departing from such principles.

What is claimed is:

1. A ground fault detector, for protecting electrical equipment from destructive arcing ground faults by opening service disconnect equipment, having a control winding, in the circuit to be protected, said ground fault detector comprising, in combination, a current transformer having a primary winding through which conductors of the protected circuit are adapted to pass, and having a secondary winding; a rectifier bridge having input terminals connected to said secondary winding and having output terminals; a storage capacitor connected directly across said bridge output terminals for direct charging solely by a rectified fault current; a voltage divider connected across said output terminals and said capacitor and monitoring the voltage across said capacitor; a normally open switch connected in a series circuit including said capacitor and a control winding of said service disconnect equipment; and a voltage responsive device connected to said voltage divider and connected in controlling relation with said normally open swtich, and operable, responsive to the voltage across said capacitor, as monitored by said voltage divider, attaining a preselected magnitude due to charging of said capacitor by a rectified fault current, to close said normally open switch to discharge said capacitor through said control winding to open said service disconnect equipment; said current transformer operating in the zero sequence mode to produce a secondary winding output voltage proportional only to a ground fault current; said current transformer and said storage capacitor being of sufficient capacity respectively, as associated herein, to operatively power said ground fault detector in response to a ground fault in the protected circuit sensed by said current transformer alone.

2. A ground fault detector, as claimed in claim 1, in which said normally open switch is an SCR; said voltage responsive device including a Zener diode and controlling the gating current to said SCR.

3. A ground fault detector, as claimed in claim 2, in which said voltage divider comprises series connected resistors; one of said resistors having a field adjustable tap connected to said voltage responsive device to adjust the pickup amperes of said ground fault detector.

4. A ground fault detector, as claimed in claim 3, in which a second one of said resistors is adjustable to set the range of pickup amperes of said ground fault detector.

5. A ground fault detector, as claimed in claim 2, including time delay means connected between said voltage responsive device and said SCR and operable to delay triggering of said SCR by said voltage responsive device for an adjustable number of cycles of the ground fault current.

6. A ground fault detector, for protecting electrical equipment from destructive arcing ground faults by opening service disconnect equipment, having a control winding, in the circuit to be protected, said ground fault detector comprising, in combination, a current transformer having a primary winding through which conductors of the protected circuit are adapted to pass, and having a secondary winding; a rectifier bridge having input terminals connected to said secondary winding and having output terminals; a capacitor connected directly across said bridge output terminals for charging solely by a rectified fault current; a voltage divider connected across said output terminals and said capacitor and monitoring the voltage across said capacitor; a normally open switch connected in a series circuit including said capacitor and a control winding of said service disconnect equipment; a voltage responsive device operatively associated with said voltage divider and in controlling relation with said normally open switch, and operable, responsive to the monitored voltage across said capacitor attaining a preselected magnitude, to close said normally open switch to discharge said capacitor through said control winding to open said service disconnect equipment; said current transformer operating in the zero sequence mode to produce a secondary winding output voltage proportional only to ground fault current and constituting the sole source of power for said ground fault detector by supplying current to said ground fault detector only responsive to a ground fault current in the protected circuit; said normally open switch being an SCR; said voltage responsive device including a Zener diode and controlling the gating current to said SCR; and time delay means connected between said voltage responsive device and said SCR and operable to delay triggering of said SCR by said voltage responsive device for an adjustable number of cycles of the ground fault current; said time delay means comprising a first transistor connected to said Zener diode and triggered conductive responsive to the monitored voltage attaining said preselected magnitude; an RC circuit connected to said first transistor and including capacitor means charged responsive to triggering conductive of said first transistor and further including an adjustable resistance means for setting the time delay cycles; and means connecting said RC circuit to said SCR and operable, responsive to the charge on said capacitor means attaining said preselected magnitude to trigger said SCR conductive to energize said control winding.

7. A ground fault detector, as claimed in claim 6, including second and third transistors controlled by said first transistor; respective second and third capacitors, said second capacitor being connected in parallel with the output circuit of said second transistor and said third capacitor being connected in parallel with the output of said third transistor; said first transistor being normally non-conductive, and said second and third transistors being normally conductive to shunt the respective associated second capactior and third capacitor; said first transistor, upon being triggered conductive, biasing said second and third transistors to the non-conductive state to provide for charging of said second and third capacitors toward said voltage of said preselected magnitude.

8. A ground fault detector, as claimed in claim 7, in which said second capacitor has a capacity substantially in excess of that of said third capacitor; said adjustable resistance selecting between said second and third capacitors for triggering of said SCR; said means connecting said RC circuit to said SCR comprising a Zener diode.

9. A ground fault detector, for protecting electrical equipment from destructive arcing ground faults by opening service disconnect equipment, having a control winding, in the circuit to be protected, said ground fault detector comprising, in combination, a current transformer having a primary winding through which conductors of the protected circuit are adapted to pass, and having a secondary winding; a rectifier bridge having input terminals connected to said secondary winding and having output terminals; a capacitor connected directly across said bridge output terminals for charging solely by a rectified fault current; a voltage divider connected across said output terminals and said capacitor and monitoring the voltage across said capacitor; a normally open switch connected in a series circuit including said capacitor and a control winding of said service disconnect equipment; a voltage responsive device operatively associated with said voltage divider and in controlling relation with said normally open switch, and operable, responsive to the monitored voltage across said capacitor attaining a preselected magnitude, to close said normally open switch to discharge said capacitor through said control winding to open said service disconnect equipment; said current transformer operating in the zero sequence mode to produce a secondary winding output voltage proportional only to ground fault current and constituting the sole source of power for said ground fault detector by supply current to said ground fault detector only responsive to a ground fault current in the protected circuit; said normally open switch being an SCR; said voltage responsive device including a Zener diode and controlling the gating current to said SCR; time delay means connected between said voltage responsive device and said SCR and operable to delay triggering of said SCR by said voltage responsive device for an adjustable number of cycles of the ground fault current; and a further capacitor connected across said bridge output terminals and isolated from said first-mentioned capacitor; said third capacitor being also isolated from said voltage divider and having a capacity very substantially higher than that of said first-mentioned capacitor.

10. A ground fault detector, an claimed in claim 9, in which said further capacitor is connected across said bridge output terminals in series with an isolating diode

* * * * *